United States Patent [19]

Bannister

[11] 4,204,967

[45] May 27, 1980

[54] TUBEWELL SCREEN FILTERS

[76] Inventor: Alan S. Bannister, "Brelade", Fair Green, Diss, Norfolk, England

[21] Appl. No.: 964,696

[22] Filed: Nov. 29, 1978

[30] Foreign Application Priority Data

Dec. 2, 1977 [GB] United Kingdom ............... 50327/77

[51] Int. Cl.$^2$ .......................................... B01D 35/02
[52] U.S. Cl. .................................... 210/459; 210/489; 405/49
[58] Field of Search ............... 210/459, 483, 484, 488, 210/489, 497 R; 405/43–45, 49, 50

[56] References Cited

U.S. PATENT DOCUMENTS

| | | | |
|---|---|---|---|
| 2,724,176 | 11/1955 | White | 210/484 X |
| 3,440,822 | 4/1969 | Hegler | 405/49 X |
| 3,685,657 | 8/1972 | Hunter et al. | 210/289 |
| 3,830,373 | 8/1974 | Sixt et al. | 210/497 R |
| 3,861,153 | 1/1975 | Maroschak | 405/49 |
| 4,006,599 | 2/1977 | Hegler et al. | 405/49 |

Primary Examiner—William A. Cuchlinski, Jr.
Attorney, Agent, or Firm—Leydig, Voit, Osann, Mayer & Holt, Ltd.

[57] ABSTRACT

A tubewell screen filter includes a core tube with apertures distributed along its length and a support structure which provides distributed support for a fine mesh filter screen with an open area of at least 12%. The support structure has helical channels which conduct water and sediment from the fine mesh filter screen to the apertures in the core tube. The filter may be of any desired length.

14 Claims, 4 Drawing Figures

TUBEWELL SCREEN FILTERS

This invention relates to tubewell screen filters.

The construction of an inexpensive but effective tubewell screen filter requires that several criteria shall be met. All the materials must be resistant over a long period to attack by chemicals in the soil or introduced for cleaning purposes, and by biological agents, the screen must not readily block up with soil particles since there is no simple way by which the screen can be cleaned once in situ, the screen filter must be robust to withstand transportation and soil loads once in situ, the materials used must be inexpensive and the assembly should be simple so that, if necessary, the screen filter can be assembled in the field.

An object of the invention is, therefore, to provide an improved tubewell screen filter.

According to the present invention there is provided a tubewell screen filter comprising means defining a passage for filtered water having apertures to allow filtered water to enter the passage, and a filter assembly mounted on and surrounding the passage-defining means, said assembly comprising support means defining channels leading to the apertures, coarser mesh screen means contiguous with the support means, and comprising finer mesh means contiguous with the coarser mesh screen means and having an open area of at least 12% of its overall area.

Further according to the present invention there is provided a tubewell screen filter comprising a core tube having openings to allow water to pass into the interior of the tube, a cylindrical screen arranged around the core tube and having an open area of at least 12% of its overall area, and a support structure pervious to water supporting the screen on the core tube and defining helical channels at least on the face directed towards the tube, the support structure providing distributed support for the screen to enable strata loads directly exerted on the screen to be transmitted to the core tube without substantial distortion of the screen.

Still further according to the present invention there is provided a tubewell screen filter comprising a filter screen, an apertured core tube, and a support structure of the filter screen defining helical channels on both faces, with the channels of one face being of opposite hand to those of the other face, and the channels of the face directed towards the core tube enabling water which has passed through the filter screen to flow to apertures of the core tube.

Tubewell screen filters embodying the invention will now be described, by way of example, with reference to the accompanying diagrammatic drawings in which.

Figures 1, 2:
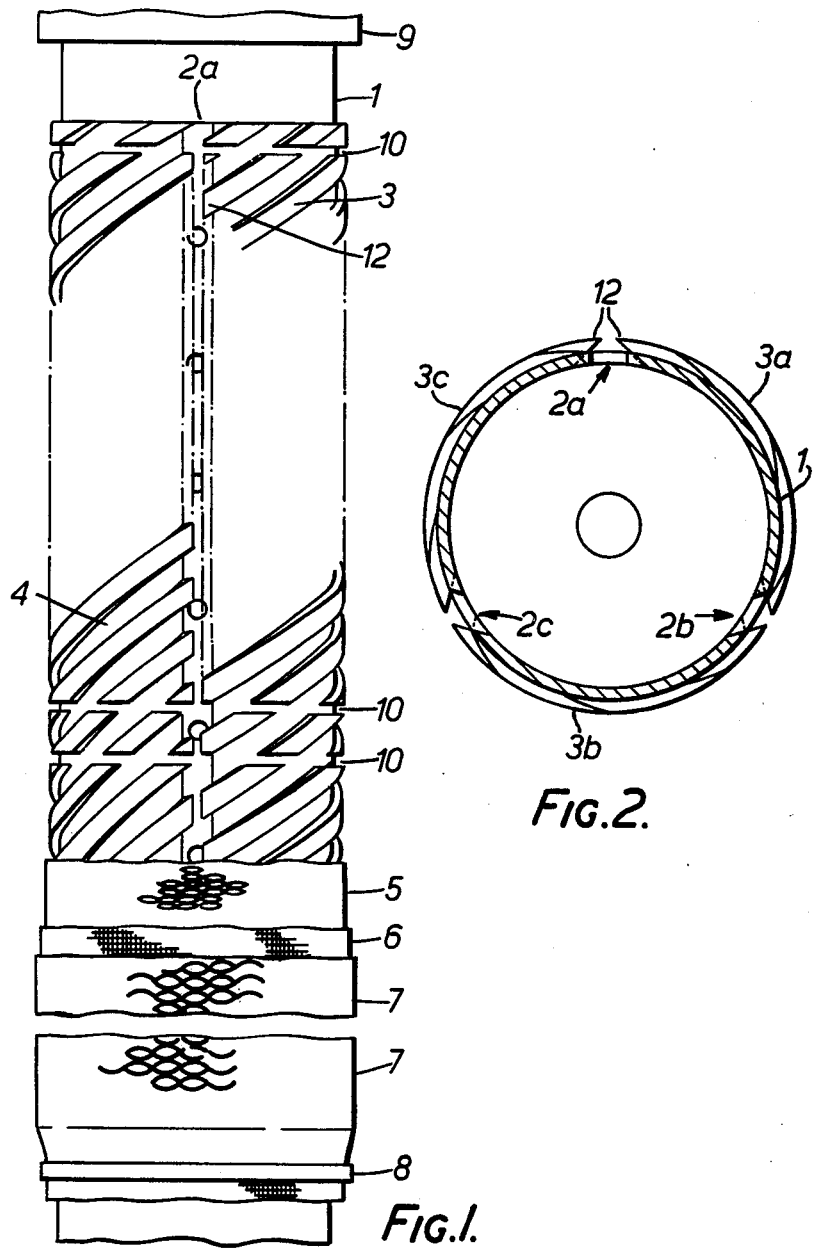
FIG. 1 is a fragmentary part cut-away view of one embodiment of tubewell screen filter in accordance with the invention.
FIG. 2 is a section on line A—A of FIG. 1.

FIGS. 1 and 2 show a tubewell screen filter comprising a core tube 1 in which are formed three longitudinally-extending rows of apertures (or openings) 2a, 2b or 2c. The aperture rows 2a, 2b and 2c are equi-angularly spaced around the tube 1 and allow filtered water to pass into the interior of the core tube 1 to be drawn off as desired. In the drawings, the apertures are shown as being of circular cross-section, but they may be of elongate slot-like form (see FIG. 4) or of any other convenient cross-section.

If the filter is to be used in a horizontal orientation, three rows of apertures are preferably used, one row lying at the top of the tube and the other two rows equally-spaced from the top row. Where the tube is to be used vertically or substantially vertically more or less rows of holes may be used and they are not necessarily equi-angularly spaced.

A support member (or structure) 3 surrounds the core tube 1 over the major portion of the circumferential extent of the tube 1. The support member 2 comprises three impervious shell portions 3a, 3b and 3c formed with multi-start helical channels 4 on their inner and outer surfaces and positioned such that their longitudinal edges are opposed across the aperture rows 2a, 2b and 2c. The channel 4 serves to direct filtered water towards the aperture rows 2a, 2b and 2c. As shown, the helical channels 4 of one shell portion 3a, 3b or 3c form continuations of the corresponding channels 4 of the other two shell portions.

There is, however, no absolute requirement that the part-helices of adjacent shells shall be in phase or in other words form complete continuous helices. If the shells are vacuum-formed considerable flexibility in the configuration of the channels is possible. Preferably locating pegs (not shown) are engaged in the tube 1 at intervals of about one half of a meter to enable the shell portions to be accurately located. The pegs may also serve to direct water and fine sediment into the apertures of the core tube.

Disposed around the support member 3 is a coarse-meshed screen 5 which serves as a distributed support for a fine-meshed filter screen 6 surrounding the screen 5. The screen 6 which can, for example, comprise a sleeve of filter material is preferably protected from external impacts by a second coarse-mesh screen 7. Metal straps 8 (only one shown) secure, at intervals, the screens 5, 6 and 7 in place around the core tube 1. The support member 3 may be combined with the screen 5.

To achieve the desired efficiency of filtration and pumping from the core tube it is desirable that the open area of each screen shall be large. This large open area is made possible because of the adequate support provided by the support member 3. Further, the large open area of the screens enables the core tube 1 to be made strong because the number of holes for ingress to the interior of the tube can be reduced. The average open area of the coarse mesh screen 5 is 28% of the overall area, and the average open area of the fine mesh screen is 17.5%. The open area of the second coarse-mesh screen 7 will be an average of 35%. While these figures have been given, by way of example, as suitable for both embodiments, the following are preferred ranges of open areas which can be used:

Fine filter screen (6): 12 to 50%
Coarse screen (5): 15 to 90%
Second coarse-mesh screen (7): 20 to 55%

It will be understood that the critical open area will be that of the filter screen 6 and the following figures are given to illustrate further typical open area percentages for various fine screen filters, and again these can be used either for the first or second embodiments.

| pic | slot or aperture size in thousanths of an inch | open area % |
| --- | --- | --- |
| 30/in. | 22 | 24.3 |
| 40/in. | 14 | 20.1 |
| 50/in. | 10 | 17.2 |

For any screen diameter the open areas of the fine mesh screen are approximately the same for the same slot size.

The tubewell filter can be made of several identical lengths which fit together by means of jointing sockets 9 (only one shown).

The main filtering function of the tubewell filter is effected by the fine-meshed screen 6. Water filtered by the screen 6 passes through the coarse-meshed screen 5 to the channels 4 of the support member to be fed to the aperture rows 2a, 2b and 2c. The coarse-meshed screen 5 serves to support the screen 6 against strata loads experienced during use of the tubewell filter.

Typically, the coarse-meshed screen 5 is similar to "Netlon" (Registered Trade Mark) 45 mesh with apertures of 0.9 mm. This material is formed by an extrusion process in which two rotary extrusion nozzles are used, the crossover points in the mesh being formed when the nozzle orifices are coincident. The fine-meshed screen 6 can be formed by two sleeves of 'Trammel' (Registered Trade Mark) fabrics, for example, of 40 pic and the 50 pic, 0.33 mm and 0.25 mm aperture size respectively. Typically, the outer, coarse-meshed, screen 7 is of an abrasion-resistant material with an aperture size of 3.0 mm. None of the particular filter-fabrics referred to is, of course, essential to the correct functioning of the well, but it is necessary that the material should have an adequate open area, be resistant to soil bacteria, prolonged exposure to water and the general conditions of the environment.

Where the tubewell filter is to be installed vertically the axes of the apertures of two rows 2a, 2b and 2c are preferably radially formed (as shown for row 2a in FIG. 2). However, where the filter is to be installed horizontally with the row of apertures 2a extending along the crown of the core tube 1, the apertures of the rows 2b and 2c are advantageously formed at 45° to the radial direction (as shown in FIG. 2) to facilitate flow of fines into the core tube 1. Thus, for a generally horizontal installation the apertures 2a should lie at the uppermost part of the tube while the rows 2b and 2c should lie, as illustrated in FIG. 2, symmetrically with respect to the vertical plane containing the row 2a and the longitudinal axis of the tube. By arranging for adjacent apertures in each row 2a, 2b and 2c to be formed at 90° to each other the tubewell filter can be vertically installed, but, in general, filters with more than three equi-angularly spaced rows of apertures are not suitable for horizontal installation.

However, where conditions demand in horizontal installations more than three rows of unequally spaced rows of apertures the rows can be so arranged that no row need lie at or adjacent to the lowermost portion of the tube when installed.

The helical form of the channels 4 of the support member 2 allows gravity to assist the removal of fines from the channels 4 and surge development acting through the screens results in an effective and desirable washing of the channels and removal of fines. Surge development is a technique used in tubewells to encourage further action by applying alternating pressure to the inside of the tube, for example by means of a loose-fitting plunger reciprocated in a portion of the tube accessible at the surface or by a short movable chamber defined by two horizontal discs and which is pressurised with water. A helix angle of 30° to 35° is preferred for horizontal use, a steeper angle being detrimental to the performance of the filter when in a horizontal position because of the combined components of flow direction over certain portions of the periphery of the channels. Thus, with a helix angle of say 45°, the horizontal component added to the peripheral component in the channels will result in an excessively shallow flow angle over a part of the periphery of the tube which will reduce the flow rate.

The shell portions 3a, 3b and 3c can be formed as corrugated P.V.C. chain-moulded tubing suitably cut, or each portion can be individually vacuum-moulded. As illustrated in FIG. 2, the shell portions 3a, 3b and 3c are preferably so formed that the ends 12 of the helical lands between the channels 4 project part way across the aperture rows 2a, 2b and 2c to increase support of the screens 5 in these regions.

The shell portions 3a, 3b and 3c are also provided with circumferentially-extending pairs of channels 10 provided at a spacing of, for example, 25 mm. These channels 10 serve to locate tying wires or other securing means (not shown) used to hold the shell portions 3a, 3b and 3c in position either permanently or temporarily during curing of a suitable adhesive or solvent cement securing the shell portion 3a, 3b and 3c to the core tube 1.

Figure 3:
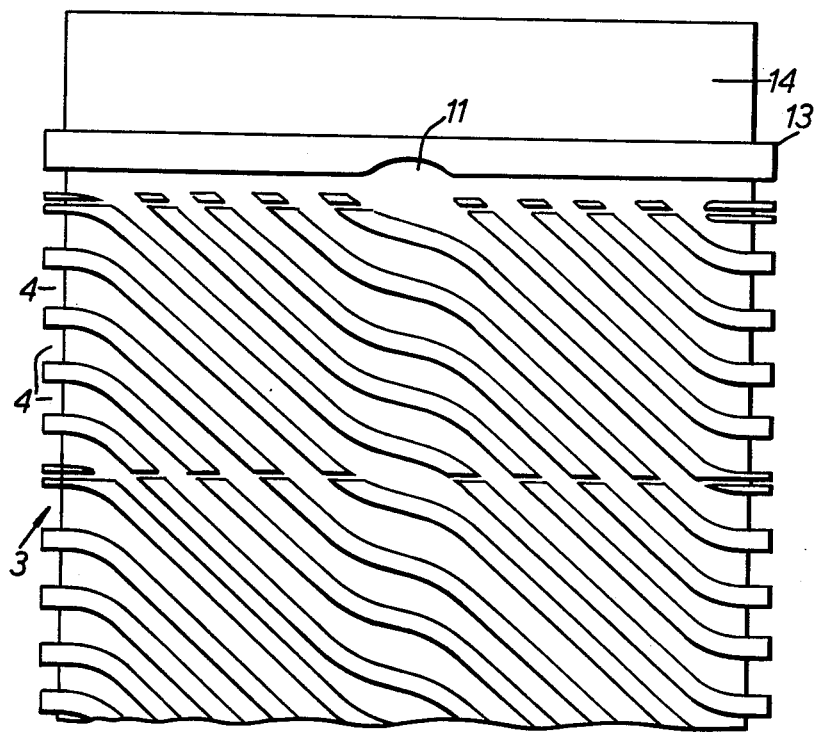
FIG. 3 is a developed view of a modified form of a support member shown in FIG. 1.

FIG. 3 in which the thick black lines indicate lands 12 illustrates a possible modified form of a shell portion of the support member 3 in which the shell portion is formed with helical channels 4 of varied helix angle. The purpose of such configuration is to assist mould release of vacuum moulded shell portions. As can be seen from FIG. 3 the helix angle of the channel 4 may reduce to an angle approaching zero at the longitudinal edges of the shell portion; the channels 4 are, however, helical over at least part of their extent.

The angle selected will depend upon the release angle dictated by the mould tools and upon the need to maintain adequate strength of the corrugations at edge portions where the imposed loads are likely to be marginally higher because of the bridging function performed by the corrugations.

The modified shell portion is provided with a channel 10 and also with a recess 11 in which the twisted ends of a tying wire may be laid. Further channels 10 and recesses 11 may be arranged at intervals along the length of the shell to provide additional tying points.

A circumferential land 13 in which the recess 11 is formed is provided immediately adjacent the circumferential channel 10 and a plain portion 14 of a diameter corresponding to the root diameter of the generally helical corrugations extends away from the land 13. The plain portion 14 ensures that the straps 8 can bed properly on the screens and thus minimize leakage paths between the inner and outer surfaces of the filter fabric.

The shell portion shown in FIG. 3 can be made by vacuum forming using a one-part or two-part mould.

The described tubewell filter can either be supplied complete to site or can be supplied as a kit of parts to be built up around a standard P.V.C. pressure pipe to form the filter. Assembly can be completed either entirely on site or partly on site and partly in a local workshop. Typically, a kit of parts comprises the following items:
(a) shell portions 3a, 3b and 3c;
(b) a tube of coarse-meshed supporting screen 5;
(c) sleeves or strips of the required grade of filter material forming the fine-meshed screen 6;
(d) a tube or coarse-meshed protective screen 7;
(e) metal straps 8, for example, Jubilee clips; and
(f) optionally, an assembly jig is provided.

Some or all of the component parts of the kit here described may be combined into one or a plurality of of parts which may be assembled around a locally supplied core tube. The core tube 1 formed from drilled P.V.C. pressure pipe could be supplied with the kit of parts or separately from a local source.

In the preferred construction, the screen 7 is secured to the assembly by the metal straps 8, but by choosing a screen 7 of appropriate properties it may be possible to secure it to the assembly by shrinking it on to the fine screen 6.

Figure 4:
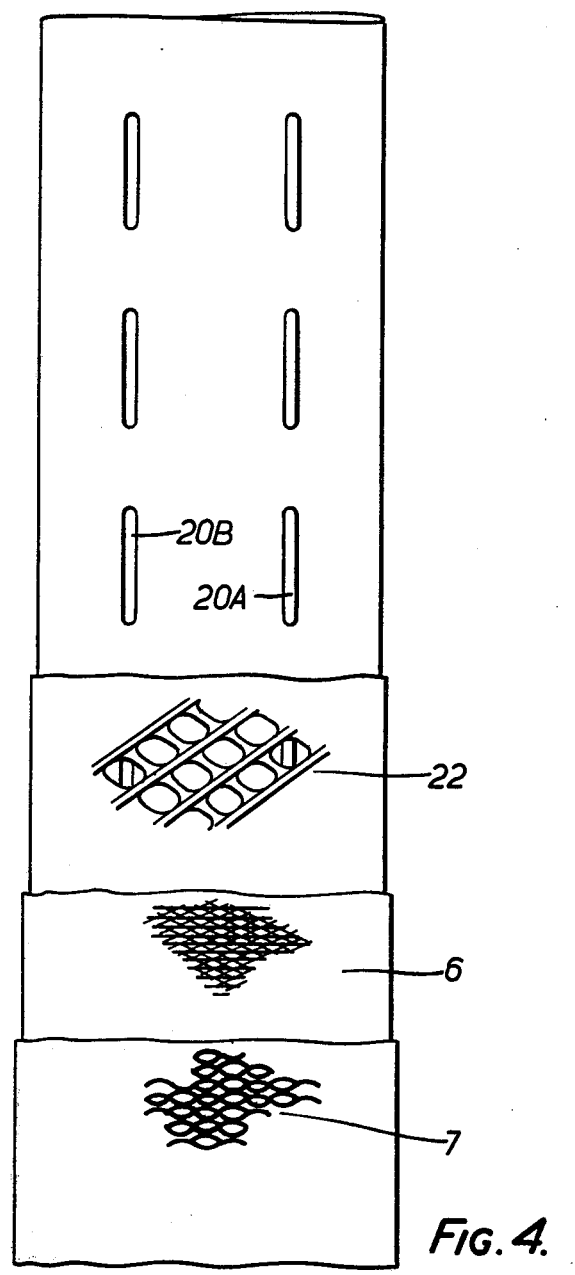
FIG. 4 is a fragmentary, part cut-away, view of a second embodiment of tubewell screen filter in accordance with the invention.

Referring now to FIG. 4, in the second embodiment shown, the core tube 1 again has a plurality of longitudinally-extending rows of apertures, but in this embodiment the apertures are in the form of slots 20a, 20b and so on. The slots are elongate in the length direction of the tube and preferably occupy approximately 6% of the total surface area of the core tube. There may be six longitudinal rows, but this number is not critical for vertical bore wells. For horizontal use, as in the first embodiment, no slots will be provided in the lower part of the tube.

The slots 20a, 20b may also be arranged in circumferentially-extending rows or the individual slots of adjacent rows may be staggered in the circumferential sense.

In this embodiment the impervious shell portions 3a, 3b and 3c of the support means or structure are replaced by a sleeve 22 of coarse mesh having a configuration which defines helical channels at the surface of the core tube and also defines helical channels at the inner surface of fine-meshed filter fabric 6 of opposite hand to the inner helical channels.

Such coarse mesh with two sets of helical channels is known per se and effectively consists of two layers of strands of plastics material with the intersections of every strand of one layer with strands of the other layer welded together. In practice the mesh may, however, be made by a continuous moulding process. The apertures in one form of the mesh are trigonal in shape, that is a figure with three angles, the sides in this case being convex.

As in the first embodiment the fine mesh filter 6 is preferably protected outwardly by a coarser mesh screen 7.

The support structure 22, the fine mesh screen 6 and the coarser mesh screen 7 all have the same length and are secured to the core tube in the same manner as for the first embodiment. The filter screens, and in particular the fine mesh screen, have the same open areas as those of the first embodiment.

The support structure 22 of this embodiment effectively replaces both the support structure 3a, 3b, 3c and the coarse filter mesh 5 of the first embodiment thus simplifying the construction and further reducing the cost. The need for longitudinal passages between the shell portions 3a, 3b is eliminated because of the use of slots, as opposed to circular apertures in the core tube. However circular apertures or openings can be used if it is accepted that in some instances travel of water along a helical channel may be somewhat extended before an aperture in the core tube is encountered. The open area of the preferred support structure is 49% of its overall area.

The apertures of the core tube may be radial or inclined as in the first embodiment.

In both embodiments the means which hold the support structure to the core tube may be effective directly only to hold the support structure, the filter screen being a tight fit on the support structure.

It should be emphasised that filter screens in accordance with the invention can be installed vertically or horizontally, the details required for these possible installations being hereinbefore described. However, it is possible to produce a universal screen filter which can be used in either orientation or, indeed, an inclined orientation.

In the embodiment of FIG. 4, the slots 20a and 20b extend longitudinally of the tube 1, but for strength and possibly other considerations the slots may extend circumferentially or may be part helical. These possible constructions may be particularly advantageous if the tube is made of glass-reinforced plastics material. The longitudinal spacing of such slots may be in the range one 1/50 to ½ of the diameter of the pipe and the lands between the individual slots circumferentially may be approximately equal to the lengths of the slots themselves.

Both of the embodiments hereinbefore described incorporate a support structure which provides an effective support for the fine mesh screen on a fully continuous basis over the whole area of the screen. As a direct result, the fine mesh screen itself need have little mechanical strength and hence the open area can be much higher than in conventional bore hole filters currently in use. It follows that there is a reduced risk of blockage of the fine mesh screen, and because of this and the helical channels leading to the openings of the core tube, it is necessary to provide the latter with only a small number of openings. This in turn gives a stronger core tube. In the second embodiment the inner and outer channels further assist in the disposal of filtered water to the inside of the core tube. Again, therefore, the need for a large number of openings into the core tube is eliminated.

While the theory of the satisfactory operation of filters in accordance with the invention has not been fully confirmed, it is believed that the satisfactory operation results from the large open area of the finer mesh screen and consequent low pressure gradient across the screen. This, in turn, results in low velocity flows within the core tube so that water already present will not be made turbulent. This contrasts with previously proposed bore hole filters where the small percentage open area, 5% or less, gives rise to a jet effect which causes turbulence within the core tube and hence head losses when pumping.

Furthermore, by varying the pitch of the holes at various levels of the tube, it should be possible to even out the inflow of water from these levels of soil in which the tubewell is installed. These characteristics are important in deep wells where undesirable tube losses may result in a section of the well remote from the pump inlet producing a yield far lower than would otherwise be possible. Taking water preferentially from one level often leads to instability in the soil and continuous build up of sediment.

In both embodiments the outer helical channels in the support structure conduct water and fine sediment away from the fine mesh filter screen and the fine sediment cannot therefore drop to the bottom of the tubewell screen thereby resulting in progressive complete blockage. The sediment is carried by the water along any given helical path and any tendency to settle out is reduced even at low flow rates. If there is any settling out a subsequent increased flow will pick up any settled sediment.

In the first embodiment, illustrated in FIGS. 1 to 3, the passages corresponding to the rows 2a, 2b, and 2c of apertures receive water and fine sediment, and there is therefore no tendency for the individual flows to accummulate and drop to the bottom of the well. The apertures in the core tube may be fitted with individual deflectors to reduce the amount of water which falls to the bottom of the well. This function may be combined with that of locating the components by the pegs hereinbefore mentioned.

In the second embodiment it is believed that the internal helical channels of the support structure carry most of the flow to the core tube slots or other apertures. The cross-section of the external helical channels may become restricted by soil pressure pushing the fine mesh filter screen inwards so that the amount of water and fine sediment flowing in the external helical channels will be small. The provision of apertures in the support structure of the second embodiment ensures ready transfer at low velocities to the internal helical channels.

Again, it is believed that the water received from the fine mesh screen travels only a short distance in the relevant external helical channel before it moves through an aperture in the support structure and joins other water and sediment flowing in an internal helical channel on its way to a convenient slot of other aperture in the core tube. The internal channel selected by water and sediment for a main flow path will be dictated by connection of that channel with a slot or other aperture in the core tube which will result in a lower back pressure in that channel. As a result internal channels not directly connected to an aperture in the core tube will lose water to channels which have such a direct connection.

Tubewell screen filters in accordance with the invention can be made in any required length since water is delivered to the interior of the core tube at a multiplicity of levels in contrast to well points currently in use wherein water is delivered to the core tube only at its lower end. With a well point filter of appreciable length the amount of water and sediment delivered to the bottom of the bore hole is likely to cause precipitation of sediment at a high rate and consequent blockage of the entry to the core tube at its lower end.

The tubewell screens hereinbefore described have the ability to self-clear fine sediment because of the large open area of the fine mesh filters and because of the large number of channels immediately inwardly of the fine mesh filter screen which ensure that the sediment will have little chance to settle because of the continuous flow within the helical channels where the flow rate is unlikely to drop to a level producing sediment precipitation.

Screen filters are currently normally used in sandy soils (aquifers) in which case it is necessary to limit the open area of the fine mesh screen to 10% or less. For the constructions hitherto used to achieve a larger open area a gravel pack surrounding the screen filter is necessary but this complicates installation.

In both embodiments the helix angle of the channels of the support structure or other part of the assembly will be in the range 10° to 80°. Preferably the helix angle will be from 25° to 60°. For many applications the best helix angle will be between 30° and 50°. For vertical use a helix angle measured as 35° has been found experimentally to be satisfactory.

In the second embodiment similar considerations apply to the helix angles of the internal and external channels of the support structure.

With filters in accordance with the invention, when pumping, the water enters the core tube from the support structure and is hydraulically balanced around the circumference of the tube so that there will be virtually no turbulence. As a result the upward flow within the tube is laminar and well losses are reduced.

I claim:

1. A tubewell screen filter comprising
   means defining a passage for filtered water having apertures to allow filtered water to enter the passage, and
   a filter assembly mounted on and surrounding the passage-defining means, said assembly comprising
   support means defining channels leading to the apertures, said support means including
   a coarse mesh material contiguous with and supported by another part of the support means, and the assembly further comprising
   a fine mesh screen means contiguous with the coarse mesh material and having an open area of at least 12% of its overall area.

2. A tubewell screen filter according to claim 1 wherein the support means is in the form of a plurality of elongate segments of helically formed non-pervious material, the individual segments being angularly spaced from one another.

3. A tubewell screen filter according to claim 1 wherein the openings of the passage-defining means are arranged in longitudinally-extending rows.

4. A tubewell screen filter according to claim 3 wherein the openings of the passage-defining means extend radially.

5. A tubewell screen filter according to claim 3 wherein the openings of at least two rows are inclined at an angle to respective radial lines of the passage-defining means.

6. A tubewell screen filter according to claim 5 wherein one row of openings extends radially and the filter screen is intended for installation in a horizontal orientation with the radial apertures uppermost.

7. A tubewell screen filter according to claim 1 wherein the support means is manufactured by vacuum moulding and is made in a plurality of parts.

8. A tubewell screen filter according to claim 1 comprising a further, outermost, screen filter of coarser mesh.

9. A tubewell screen filter comprising
   a core tube having openings to allow water to pass into the interior of the tube,
   a cylindrical screen arranged around the core tube and having an open area of at least 12% of its overall area, and
   a support structure pervious to water supporting the screen on the core tube and defining helical channels at least on the face directed towards the tube, the support structure providing distributed support for the screen to enable strata loads directly exerted on the screen to be transmitted to the core tube without substantial distortion of the screen.

10. A tubewell screen filter according to claim 9, wherein the support structure includes non-pervious sheet material means defining the helical channels and a mesh of coarser material than the screen and serving to provide said distributed support.

11. A tubewell screen filter comprising
a filter screen,
an apertured core tube, and
support structure mounted on the core tube and carrying the filter screen so as to provide distributed support therefor,
helical channels being provided for delivering to the apertures of the core tube material which has passed through the filter screen, said channels lying between the inner face of the filter screen and the inner surface of the core tube.

12. A tubewell screen filter according to claim 11 wherein the support structure defines helical channels on both faces, with the channels of one face being of opposite hand to those of the other face, and the channels of the face directed towards the core tube enabling water which has passed through the filter screen to flow to apertures of the core tube.

13. A tubewell screen filter according to claim 11, wherein the support structure has mesh apertures of trigonal shape with convex sides.

14. A tubewell screen filter according to claim 11, wherein the support structure and helical channels are interrupted at a row of apertures of the core tube.

* * * * *